(12) United States Patent
Halbritter et al.

(10) Patent No.: US 12,601,814 B2
(45) Date of Patent: Apr. 14, 2026

(54) OPTOELECTRONIC DEVICE AND LIDAR SYSTEM

(71) Applicant: OSRAM Opto Semiconductors GmbH, Regensburg (DE)

(72) Inventors: Hubert Halbritter, Dietfurt-Toeging (DE); Ralph Wirth, Lappersdorf (DE); Peter Brick, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 1074 days.

(21) Appl. No.: 17/440,196

(22) PCT Filed: Mar. 17, 2020

(86) PCT No.: PCT/EP2020/057309
§ 371 (c)(1),
(2) Date: Sep. 17, 2021

(87) PCT Pub. No.: WO2020/193290
PCT Pub. Date: Oct. 1, 2020

(65) Prior Publication Data
US 2022/0349998 A1 Nov. 3, 2022

(30) Foreign Application Priority Data
Mar. 27, 2019 (DE) .................... 10 2019 107 957.8

(51) Int. Cl.
*G01S 7/481* (2006.01)
*G01S 7/4865* (2020.01)
(Continued)

(52) U.S. Cl.
CPC .......... *G01S 7/4811* (2013.01); *G01S 7/4865* (2013.01); *G01S 7/499* (2013.01); *G01S 17/10* (2013.01); *G01S 17/931* (2020.01)

(58) Field of Classification Search
CPC ...... G01S 7/4811; G01S 7/4865; G01S 7/499; G01S 17/10; G01S 17/931; G01S 7/4817; G01S 7/4815
See application file for complete search history.

(56) References Cited

U.S. PATENT DOCUMENTS 8,699,533 B1    4/2014   Wach
9,831,630 B2 *  11/2017  Lipson .................. G01S 7/4815
(Continued)

FOREIGN PATENT DOCUMENTS

CN      102506748 A      6/2012
CN      105122450 A      12/2015
(Continued)

OTHER PUBLICATIONS

U.S. Appl. No. 62/654,972 (Year: 2018).*
(Continued)

*Primary Examiner* — Yuqing Xiao
*Assistant Examiner* — Jempson Noel
(74) *Attorney, Agent, or Firm* — Viering, Jentschura & Partner mbB

(57) ABSTRACT

An optoelectronic device, in particular for the detection of obstacles and/or for distance measurement, may include a transmitting device for emitting laser beams. The transmitting device may include an array of pixels where each pixel of the pixel array comprises at least one laser, such as an optoelectronic laser, e.g. a VCSEL. The pixels of the pixel array may be divided into several sets of pixels, and the transmitting device may be configured to operate the sets of pixels in different, successive time intervals.

26 Claims, 8 Drawing Sheets

(51) Int. Cl.
_G01S 7/499_ (2006.01)
_G01S 17/10_ (2020.01)
_G01S 17/931_ (2020.01)

(56) References Cited

U.S. PATENT DOCUMENTS

| | | | | |
|---|---|---|---|---|
| 2003/0185264 | A1* | 10/2003 | Ishizu | H01S 3/0941 |
| | | | | 372/75 |
| 2005/0047308 | A1 | 3/2005 | Park | |
| 2014/0376579 | A1 | 12/2014 | Wach | |
| 2016/0076731 | A1* | 3/2016 | Mönch | G02B 19/0014 |
| | | | | 362/97.1 |
| 2016/0274223 | A1 | 9/2016 | Mai | |
| 2016/0286202 | A1 | 9/2016 | Romano et al. | |
| 2017/0176579 | A1* | 6/2017 | Niclass | G01S 17/10 |
| 2017/0307736 | A1* | 10/2017 | Donovan | G01S 7/484 |
| 2017/0343653 | A1* | 11/2017 | Weinberg | G01S 17/10 |
| 2018/0038944 | A1* | 2/2018 | Hellmig | H01S 5/423 |
| 2018/0038959 | A1* | 2/2018 | Akatsu | G01S 17/931 |
| 2018/0068458 | A1* | 3/2018 | Wan | G06T 7/521 |
| 2018/0074196 | A1* | 3/2018 | Weinberg | G01S 17/08 |
| 2018/0131915 | A1* | 5/2018 | Nakamura | H04N 9/3129 |
| 2018/0299553 | A1* | 10/2018 | Takemoto | G01S 7/4865 |
| 2018/0329061 | A1 | 11/2018 | Pacala et al. | |
| 2019/0025426 | A1 | 1/2019 | Satyan et al. | |
| 2019/0310375 | A1* | 10/2019 | Finkelstein | G01S 7/484 |
| 2020/0301010 | A1 | 9/2020 | Takenaka | |

FOREIGN PATENT DOCUMENTS

| | | | |
|---|---|---|---|
| CN | 206322998 | U | 7/2017 |
| DE | 102016219510 | A1 | 5/2017 |
| EP | 1511016 | A2 | 3/2005 |
| EP | 3282285 | A1 | 2/2018 |
| JP | 2001085798 | A | 3/2001 |
| JP | 2003198018 | A | 7/2003 |
| JP | 2005071562 | A | 3/2005 |
| JP | 2015227781 | A | 12/2015 |
| JP | 2016176721 | A | 10/2016 |
| JP | 2016540189 | A | 12/2016 |
| JP | 2018511785 | A | 4/2018 |
| JP | 2019516101 | A | 6/2019 |
| JP | 2020153796 | A | 9/2020 |
| WO | 2017184336 | A2 | 10/2017 |

OTHER PUBLICATIONS

Notice of Reasons for Refusal issued for the corresponding Japanese patent application No. 2021-557150, dated Oct. 18, 2022, 4 pages (for informational purposes only).

Search Report by Registered Search Organization issued for the corresponding Japanese patent application No. 2021-557150, dated Sep. 2, 2022, 24 pages (for informational purposes only).

Cai Xi-ping et al., "State-of-the-art of Three-dimensional Imaging Laser Radar", pp. 31-35, including English Abstract, dated Jul. 2008, OME Research Forum.

Notice of Grant of Patent for parallel CN Application 202080025007.2, dated Aug. 22, 2024, 1 page (for information purposes only).

International Search Report issued for corresponding PCT Application No. PCT/EP2020/057309, mailed on Jul. 2, 2020, 7 pages (for informational purpose only).

German Search Report issued for corresponding DE Application No. 10 2019 107 957.8, dated Mar. 2, 2021; 14 pages (for informational purpose only).

Chinese office action issued for the corresponding Chinese patent application No. 202080025007.2, dated Nov. 28, 2023, 9 pages (for informational purposes only).

* cited by examiner

OPTOELECTRONIC DEVICE AND LIDAR SYSTEM

CROSS-REFERENCE TO RELATED APPLICATIONS

The present application is a national stage entry according to 35 U.S.C. § 371 of PCT Application No. PCT/EP2020/057309 filed on Mar. 17, 2020; which claims priority to German Patent Application Serial No. 10 2019 107 957.8 filed on Mar. 27, 2019; all of which are incorporated herein by reference in their entirety and for all purposes.

TECHNICAL FIELD

The present disclosure relates to an optoelectronic device, in particular for detecting obstacles and/or measuring distances, and to a lidar system.

BACKGROUND

Lidar is an abbreviation for "Light Detection and Ranging", and lidar systems are also referred to as ladar systems. Where ladar stands for "Laser Detection and Ranging." Lidar systems, also referred to as LIDAR sensor systems in the following, work in a similar way to radar systems and are used, for example, for optical distance and speed measurement as well as, among other things, for measuring atmospheric parameters or for creating height profiles of the earth's surface. Lidar systems use laser radiation, in contrast to radar systems, which use radio waves.

The data sets generated by a LIDAR sensor system can be used to control and steer vehicles (e.g., cars, ships, aircrafts, drones), including vehicles with driver assistance systems, as well as semi- or fully autonomous driving vehicles. In addition, LIDAR systems can also be used for many different functions that are directed at the interior of a vehicle. Such functions may include driver or passenger monitoring functions, as well as occupancy detection systems based, for example, on methods such as eye tracking, facial recognition (evaluation of head rotation or tilt), measurement of eye blinks, etc. LIDAR sensor systems can thus be mounted both outside and inside a vehicle, and they can be integrated into optical systems such as headlights and other vehicle lighting components located at various locations on a vehicle (front, rear, side, corner, interior).

A light source for LIDAR applications thus provides electro-magnetic radiation by means of which information about objects in the vicinity of the LIDAR system is determined. Common LIDAR light sources used in the prior art emit radiation in a nonvisible wavelength range, in particular infrared radiation (IR) in the wavelength range from 850 nm to 8100 nm. In a non-limiting embodiment, the light source emits radiation in a narrow bandwidth range with a half-width (FWHM) between 1 ns and 100 ns.

Thus, a LIDAR sensor system is a system that uses light or electromagnetic radiation to derive information about objects in the vicinity of the LIDAR system. LIDAR-sensor systems typically include a variety of components, as will be described below. In an exemplary application, such LIDAR systems are arranged on a vehicle to derive information about objects on and near a road. Such objects may include other road users (e.g., vehicles, pedestrians, bicyclists, etc.), elements of road infrastructure (e.g., traffic signs, traffic signals, lane markings, guardrails, traffic islands, sidewalks, bridge piers, etc.), and also objects that may be intentionally or unintentionally found on or near a road.

Information derived via such a LIDAR sensor system may include the distance, velocity, acceleration, direction of travel, trajectory, attitude, and/or other physical or chemical properties of these objects. To derive this information, the LIDAR system may determine the time of flight (TOF for Time of Flight) or variations of physical properties such as phase, amplitude, frequency, polarization, structured point pattern, triangulation method, etc. of the emitted electromagnetic radiation after the emitted radiation has been reflected or scattered by at least one object in the Field of Illumination (FOI, also referred to herein as the target field) and detected by a detector.

Prior art lidar systems use mechanical and non-mechanical scanning systems. Mechanical solutions may include rotating mirrors, oscillating mirrors, especially oscillating microelectromechanical mirrors (MEMS), digital mirror devices (DMD), galvo scanners, fiber-based scanning systems, etc. The movable mirrors can have planar surface areas, for example oval, rectangular or polygonal, and can be tilted or pivoted about one or more axes.

Non-mechanical solutions may include so-called optical phase-locked arrays (OPA), in which the phases of light waves are changed by dynamically controlling the optical properties of an adjustable optical element, for example phase modulators, phase shifters, liquid crystal elements (LCD), etc. In each of these cases, back-reflected radiation can be detected by means of a single detector. The lasers used as light sources, as well as the moving mirrors and other scanning or flash systems described above, are relatively expensive.

Other prior art lidar systems allow simultaneous illumination of the target area. The laser beams reflected back from the entire target area, also referred to as the field of view (FoV), are detected by means of a high-resolution detector system, also referred to as a camera in the following. The captured camera image provides location information of the target area. Due to the high resolution required, such cameras or detection systems are relatively expensive.

A detector is a device capable of providing an output signal (to an evaluation electronic unit) that is qualitatively or quantitatively correlated to the presence or change of physical (or chemical) properties in its environment. Examples of such physical properties are temperature, pressure, acceleration, brightness of light (UV, VIS, IR), vibrations, electric fields, magnetic fields, electromagnetic fields, acoustic or ultrasonic waves, etc. Detector devices may include cameras (mono or stereo) with, for example, light-sensitive CCD or CMOS chips or stacked multilayer photodiodes, detectors for radio waves (RADAR systems), photodiodes, temperature sensors such as NTC elements, i.e. a thermistor with a negative temperature coefficient, accelerometers, etc.

A photodetector is a detection device sensitive to the impact of electromagnetic radiation. Typically, light photons are converted into a current signal when they impinge the photosensitive element. Photosensitive elements can include semiconductor elements with pn junction regions where photons are absorbed and converted into electron hole pairs. Many different types of detectors can be used for LIDAR applications, such as photodiodes, PN diodes, PIN diodes (positive intrinsic negative diodes), APD (avalanche photodiodes), SPAD (single photon avalanche diodes), SiPM (silicon photomultipliers), CMOS sensors (complementary metal oxide semiconductor, CCD (charge-coupled device), stacked multilayer photodiodes, etc.).

In LIDAR systems, a photodetector may be used to detect (qualitatively and/or quantitatively) echo signals from light emitted from the light source into the field-of-view (FoV) and subsequently reflected or scattered by at least one object within the FoV. The photodetector may comprise one or more photosensitive elements (of the same type or different types), which may be arranged in linear strips or in two-dimensional arrays. The photosensitive area may have a rectangular, square, polygonal, circular or oval shape. A photodetector may be covered with Bayer-like visible or infrared filter segments.

SUMMARY

An objective is to provide an optoelectronic device which can be realized relatively simply and inexpensively and which is particularly well suited for use in lidar systems.

The object is solved by an optoelectronic device having the features of claim 1. Non-limiting embodiments and developments are given in the dependent claims.

An optoelectronic device, which is suitable in particular for detecting obstacles and/or for distance measurement, for example in a lidar system, comprises a transmitting device for emitting laser beams, wherein the transmitting device comprises an array of pixels, wherein each pixel of the pixel array comprises at least one laser, in particular an optoelectronic laser, such as a VCSEL (Vertical-Cavity Surface-Emitting Laser) or a VECSEL (Surface-Emitting Semiconductor Laser with an external Laser Resonator). The optoelectronic device optionally also comprises a receiving device for detecting laser beams, in particular those reflected back from objects. In the optoelectronic device, the pixels of the pixel array are divided into several sets of pixels, and the transmitting device is configured to operate the sets of pixels at different, successive time intervals.

The optoelectronic device thus comprises a pixelated transmitting device for emitting laser beams. The pixel array can comprise, for example, 600 by 200 pixels. Each pixel can comprise one or more VCSELs. Each pixel is assigned to one of several sets of pixels. The pixels of a set of pixels are operated for a short time, i.e. in particular switched on for a short time and then switched off again. The pixels of the other sets of pixels are not operated. The sets of pixels are operated one after the other in successive time intervals, each of which can be a microsecond long, for example. The time of 1 µs is to be seen only as an example. Other time intervals are possible. For example, the time intervals can be in the range between 1 µs inclusive and 3 µs inclusive.

The transmitting device thus allows a simultaneous illumination of a target area via the laser light from the respective pixels operated in a time interval. Since not all pixels of the pixel array are operated simultaneously, but only the pixels assigned to a respective set of pixels are operated in a time interval, no high-resolution receiving device is required for the detection of the back-reflected laser beams, but a receiving device with a relatively coarse resolution is sufficient, as will be explained in more detail below. This reduces the costs for the receiving device and thus also for the optoelectronic device.

A prior art lidar system, which uses movable mirrors to scan a target area with a collimated laser beam, normally requires lasers that are driven with relatively high electrical currents, for example in the range between 30 and 40 A. The generated laser pulses can have peak powers of 100 W or more. Due to the high electrical currents required to drive such lasers, it is problematic to generate laser pulses shorter than a few nanoseconds in known lidar systems. Since the energy of the laser pulses affects eye safety, the maximum pulse power of the laser pulses is usually limited.

In a transmitting device of an optoelectronic device, the pixels or a group of several pixels can be controlled individually. The electrical currents required for this are generally a factor of 10 smaller than the currents mentioned above. They are thus, for example, in the range of a few amperes. This allows laser pulses to be generated that are shorter than a nanosecond. The pulse energy of the laser pulses can thus be reduced, resulting in an improvement in eye safety.

In addition, the laser radiation is distributed in a target area or in the spatial area between the emitting device and an illuminated target area. This results in a lower power density of the emitted laser radiation, which in turn has a beneficial effect on eye safety.

Prior art lidar systems that use moving mirrors to scan a target area with a collimated laser beam are—when used in a motor vehicle—normally only put into operation when the vehicle has exceeded a certain speed. One reason for this is to ensure eye safety for passers-by, for example. Since an optoelectronic device offers improved eye safety, an optoelectronic device, when used in a lidar system in a motor vehicle, allows to be put into operation at lower speeds.

In prior art lidar systems that use movable mirrors, a mirror normally oscillates or rotates at a resonant frequency. Thus, a light pulse can only be emitted into a certain angular range at certain periodically repeating time points. This means, for example, that in the case of two vehicles approaching each other, each of which uses a LIDAR system, no unambiguity or distinction can be established between an external LIDAR pulse and a LIDAR pulse reflected on an object, which originates from the vehicle itself, since, as mentioned, it remains unclear from which vehicle the laser pulse was emitted. This problem is known as "jamming".

In one embodiment, it may be provided that the sets of pixels are operated or operable in changing order in the different successive time intervals. Thus, the sets of pixels can be activated in any, in particular random, sequence and thereby carry a stochastic time stamp. A stochastic time stamp can be generated using known mathematical effects, for example based on Fibonacci sequences, or physical effects, for example based on thermal noise provided by a semiconductor device.

This can avoid correlation to laser radiation from other sources and/or periodicity in the emitted laser radiation. The problem of "jamming" thus no longer occurs, or at least occurs to a reduced extent.

In one embodiment, the pixel array is divided into a number N of segments, one or more pixels from each segment being assigned to a respective set of pixels.

In one embodiment, the pixel array is divided into a number N of segments, with one pixel from each segment being assigned to a respective set of pixels. Thus, only one pixel from each segment is operated in each time interval. This makes it possible to use a receiving device with a relatively low resolution for the detection of, in particular, back-reflected laser beams. For example, a camera with a corresponding number N of segments can be used. The resolution of the camera can thus be defined by the number N of segments of the emitter. However, the segmentation of the camera may not correspond to the number N of segments of the pixel array.

Each segment of the pixel array can comprise the same number L of pixels. Thus, the pixel array may be divided into N segments of equal size. This can ensure that each set of pixels can always be assigned exactly one pixel from each segment. Alternatively, the segments of the pixel array can be of different sizes. For example, a better resolution and thus a larger number of pixels can be provided in the segments in the center of the pixel array. In contrast, fewer pixels and thus a lower resolution may be provided at the edge of the pixel array.

There may be a number K of sets of pixels, where the number K of sets of pixels corresponds to the number L of pixels per segment. Thus, exactly one pixel from each segment can be assigned to each of the sets of pixels. This is only an example. There can also be another relation between the number K of sets of pixels and the number L of pixels per segment, for example K=½ *L or K=⅓ *L.

The receiving device may have a two-dimensional detection field which is divided into a number M of detection areas, wherein each detection area is configured to detect laser beams from the transmitting device. The two-dimensional detection field can be an image sensor, for example a CCD sensor. CCD stands for Charged-Coupled Device. By dividing the detection field into M detection areas, the detection field and thus the receiving device can have a relatively coarse resolution. A low-cost realization is thereby made possible. The number M of detection areas of the detection field of the receiving device can correspond to the number N of segments into which the pixel array is divided.

It can be provided that one detection area is assigned to each segment in such a way that the detection area is provided for the detection of back-reflected laser beams originating from the assigned segment. For example, a segment of the pixel array can be used to illuminate a partial area of a target field that is located at a distance, for example 200 m, in front of the receiving device. The illumination of the partial area of the target field by means of the segment can be carried out via a corresponding optical system. Laser beams reflected back from the partial area can be directed, for example also via suitable optics, hereinafter also referred to as sensor optics, to the detection area associated with the segment. By means of the segmented pixel array, a segmented illumination of a target field is possible, whereby a detection of back-reflected laser beams from the illuminated segments of the target field is possible via the detection field, which is also divided into areas.

The term sensor optics includes all types of optical elements that can be used in a LIDAR sensor system to ensure or improve its function. For example, such optical elements may include lenses or sets of lenses, filters, diffusers, mirrors, reflectors, optical fibers, diffractive optical elements (DOE), holographic optical elements, and, in general, any type of optical element that can affect light or electromagnetic radiation via refraction, diffraction, reflection, transmission, absorption, scattering, etc.

Each detection area can comprise at least one pixel for detecting the laser beams. The receiving device can thus have a relatively coarse resolution.

In one embodiment, all pixels of the same segment of the pixel array emit laser beams with the same polarization and/or the same wavelength. In contrast, different segments of the pixel array may emit laser beams with different polarization and/or different wavelengths and/or different power. This can improve the detection of back-reflected laser beams. Also, the pixels of the pixel array can emit pulsed laser radiation in the form of single pulses of equal pulse height or sequences of multiple pulses with uniform pulse height or with varying pulse heights. The pulses may have a symmetrical pulse shape, such as a rectangular pulse shape. Alternatively, the pulses may have asymmetric pulse shapes with differences in their respective rising and falling edges.

For example, the pixels of at least a first segment of the pixel array may emit laser beams with a first polarization, and the pixels of at least a second segment of the pixel array may emit laser beams with a second polarization, the first and second polarizations being different. If a polarization-dependent detection takes place in the detection areas of the detection field of the receiving device, then, for example, stray light of laser radiation from the first segment can be avoided in the detection area which is assigned to the second segment of the pixel array.

It may be provided that the pixels of at least a first segment of the pixel array emit laser beams with a first wavelength, and that the pixels of at least a second segment of the pixel array emit laser beams with a second wavelength, the first wavelength and the second wavelength being different. In the corresponding manner as with polarization-dependent detection, the proportion of stray light in the detection areas of the detection field of the receiving device can also be reduced if wavelength-dependent detection takes place in the detection areas. This can be achieved in particular by arranging a spectral filter, for example an edge filter or a bandpass filter, in front of each detection area, which allows light with the wavelength emitted by a segment of the pixel array assigned to the respective detection area to pass, while the filter blocks other wavelengths.

The segments of the pixel array may form at least two rows, each row comprising at least two pixels. Thus, an array-like segmentation of the pixel array can be realized.

The pixels of a first segment of the pixel array may emit laser beams with a polarization that is different from the polarization of the laser beams emitted by the pixels of at least one second segment, the second segment being arranged adjacent to the first segment in the same row or the row below. Segments of the pixel array adjacent to each other in a row or column can therefore emit laser beams with different polarization.

The pixels of a first segment of the pixel array may emit laser beams of a wavelength different from the wavelength of the laser beams emitted by the pixels of at least a second segment, the second segment being arranged adjacent to the first segment in the same row or the row below. Segments of the pixel array adjacent to each other in a row or column can thus emit laser beams with different wavelengths.

Each detection area can comprise a polarization filter that is adapted to the polarization of the laser beams emitted by the pixels of the assigned segment. The detection of stray light can thus be reduced.

To avoid the detection of stray light, in particular solar background light, but also light from other lidar sources, it is also advantageous if each detection area comprises a spectral filter which is adapted to the wavelength of the laser radiation emitted by the pixels of the assigned segment.

In one embodiment, at least one and each pixel of the pixel array may comprise at least two lasers having different temperature operating ranges. The optoelectronic device can thus be adapted with respect to the temperature operating range in which the optoelectronic device can be used. In this way, requirements such as those in automotive engineering can be met in particular.

With regard to automotive requirements, it is particularly advantageous if the temperature operating range of at least one of the lasers of a pixel lies in a first interval, for example in the range from −40° C. to +40° C., and if the temperature operating range of at least one other laser of the pixel lies in a second interval, for example in the range from +40° C. to +120° C. The temperature operating range of −40° C. to +120° C., as required in automotive applications, can thus be satisfied. A separation of the temperature operating range into other intervals between −40° C. and 120° C. is also possible.

When using VCSELs as lasers in the pixels, the temperature range can be adjusted by "detuning" the cavity with respect to the band gap in the VCSELs if the quantum wells in the VCSELs are the same. The resonance wavelength of the cavity can be adjusted via the epitaxial layer thicknesses of a respective VCSEL. With the same resonance wavelength, the temperature range can also be adjusted by "detuning" from cavity to band gap. The band gap can be adjusted via the layer thicknesses of the quantum wells.

It may be provided that the at least two lasers with different temperature operating ranges of a pixel are commonly operable. Depending on the temperature range, normally only the laser in whose temperature operating range the current temperature falls provides a significant contribution to the optical power. An electronic circuit for controlling the lasers within a pixel can be implemented relatively easily. Furthermore, no temperature sensor is required.

Alternatively, it can be provided that, depending on a current temperature, the at least one laser can be operated in whose temperature operating range the current temperature lies. This can be realized via an appropriately designed electrical circuit for controlling the lasers of a pixel and using a temperature sensor. The temperature sensor can be arranged in the vicinity of the pixel array or, for example, on a housing of the transmitting device or the optoelectronic device. The temperature sensor can also be an ambient temperature sensor, which is present in a modern motor vehicle.

To meet, for example, automotive requirements, an alternative embodiment may also provide that lasers, in particular VCSELs, are arranged in each pixel of the pixel array that have the same temperature operating range, whereas lasers with different temperature operating ranges are arranged in different pixels. For example, lasers, in particular VCSELs, with two different temperature operating ranges can be provided. For example, the first temperature operating range may range from −40° C. to +40° C., and the second temperature operating range may range from +40° C. to +120° C., for example. In each pixel of the pixel array, either lasers with the first temperature operating range or alternatively with the second temperature operating range may be arranged. An equal number of pixels of the pixel array may include lasers with the first temperature operating range and the second temperature operating range.

An optoelectronic device, in particular for the detection of obstacles and/or for distance measurement, may include: a transmitting device for emitting laser beams, wherein the transmitting device comprises an array of pixels, wherein each pixel of said pixel array comprises at least one laser, in particular an optoelectronic laser, such as a VCSEL, µVCSEL or VECSEL, wherein the pixels of said pixel array are divided into at least a first set of pixels and a second set of pixels, wherein each pixel of the first set of pixels comprises at least one optoelectronic laser configured for laser operation in a first temperature range, for example between −40° C. and +25° C., and wherein each pixel of the second set of pixels comprises at least one optoelectronic laser configured for laser operation in a second temperature range, for example between 25° C. and +90° C.

A VCSEL or a µVCSEL, also referred to as a micro-VCSEL, is particularly suitable as an optoelectronic laser. VECSELs or µVECSELs can also be considered.

Due to their design, VCSELs can have the property that the wavelength emitted in laser operation has a much smaller drift over temperature in normal laser operation compared to edge emitting lasers (EEL) because of the laser mode formed in the resonator arrangement. This drift can be determined by the optical path length of the cavity formed between the mirrors of the resonator array, with the active zone located in the cavity. In particular, the optical path length depends on the refractive indices of the materials in the resonator array, which have a small temperature dependence. Higher longitudinal modes have a wavelength far outside the gain spectrum of the active material due to the small resonator length in a VCSEL or µVCSEL. The effective resonator length can be in the range of a few wavelengths. Lateral modes can be suppressed by using a suitable aperture.

In a wavelength range between 900-950 nm, which is of interest for sensor applications, a VCSEL can exhibit a drift of the emitted wavelength of 0.07 nm/K. An edge-emitting laser, on the other hand, has a comparatively long cavity, for example 300 µm to 3 mm, so that the longitudinal modes lie tightly within the gain spectrum of the active material. If no further action is taken, the mode with the largest gain oscillates in each case.

The maximum of the gain spectrum essentially shifts with the band gap of the active material above temperature. This drift is much larger than the dependence of the refractive indices on temperature. For example, a typical 905 nm EEL laser has a wavelength temperature coefficient of 0.28 nm/K.

An edge emitting laser has a much lower temperature dependence of optical power on temperature due to the properties described above, since its laser mode always oscillates at maximum gain. In a VCSEL or µVCSEL, on the other hand, the wavelength is determined by the short resonator. The gain spectrum shifts above the temperature through the resonance given by the resonator. This leads to a strong dependence of the gain and thus the power on the temperature.

For many sensing applications, ambient light, for example sunlight, plays an important role as a disturbance factor. The signal-to-noise ratio (SNR) can be negatively affected by ambient light, or the sensor can simply be overexposed by ambient light, for example when a lidar system "looks" into the sun.

It may therefore be important to perform wavelength filtering on the sensor side. Due to the lower temperature drift of the wavelength in a VCSEL or a µVCSEL, such a filter can be made narrower than in the case of an edge-emitting laser. For example, an example calculation with typical parameters for an automotive application predicts a bandpass filter width for a VCSEL source of 10 nm and for an edge-emitting laser of 70 nm. From this, a suppression of the solar scattering photons by about one order of magnitude can be derived.

In the optoelectronic device described herein, which can be designed for example as a VCSEL array or VCSEL field, a number of the optoelectronic lasers designed in particular as VCSELs are configured for laser operation in the first temperature range and a further number of the optoelectronic lasers designed in particular as VCSELs are configured for laser operation in the second temperature range. Thus, a relatively high temperature dependence of the power of VCSELs can be compensated by means of the VCSEL field.

The optoelectronic device is particularly suitable for use on a motor vehicle, for example in a lidar system, and/or as an emitter for sensor applications, for example with reduced luminance requirements, which can exhibit both a low drift in wavelength and optical power over temperature.

The first temperature range is different from the second temperature range. The first and second temperature ranges may be contiguous, with no overlap or alternatively a partial overlap of the temperature ranges can be provided.

It may be provided that a respective optoelectronic laser comprises a resonator arrangement and an active zone, the active zone being embedded in the resonator arrangement. The resonator arrangement may be formed by mirrors in which the active zone is embedded. The mirrors may be realized by layers of material, for example as Bragg mirrors. These are also referred to as "distributed Bragg reflectors", abbreviated "DBR". These are alternating, thin layers of dielectric material of different refractive indices. The active zone can be formed in a known manner by layers of semiconducting material, for example with quantum troughs or quantum dots.

For VCSELs configured for laser operation in the first temperature range or in the second temperature range, the same emission wavelength can be emitted by designing the mirror layers and the length of the cavity. However, the VCSELs may differ by the wavelength position of the gain spectrum of the active region at the same temperature. This allows VCSELs to be optimized for laser operation in the lower, first temperature range, for example between –40 to 25° C., and VCSELs to be optimized for laser operation in the upper, second temperature range, for example between 25° C. and 90° C.

A different gain spectrum can be achieved, for example, by a different design of the active zone, for example, by using quantum wells of different thickness and/or by different bias and/or different composition of the quantum wells.

The resonator arrangements of the optoelectronic lasers of the first set of pixels and the resonator arrangements of the optoelectronic lasers of the second set of pixels may have the same or different configuration and/or dimensions. In particular, the mirror layers and the length of the cavity between the mirror layers may be at least substantially the same. The cavity is the area between the mirror layers in which the active zone is located. The cavity thus does not form a hollow space between the mirrors, but is filled with material, in particular the active zone.

According to a development, the active zones of the optoelectronic lasers of the first set of pixels and the active zones of the optoelectronic lasers of the second set of pixels may be differently configured and/or dimensioned, wherein the active zones of the optoelectronic lasers of the first set of pixels are tuned to laser operation in the first temperature range, and wherein the active zones of the optoelectronic lasers of the second set of pixels are tuned to laser operation in the second temperature range. As explained above, the active zones may differ in the wavelength position of the gain spectrum at the same temperature, for example due to differently designed quantum wells.

The optoelectronic lasers of the first set of pixels can origin from a first wafer and the optoelectronic lasers of the second set of pixels can origin from a second wafer. In this way, VCSELs, for example, which are configured for operation in the different temperature ranges can be provided in a process-technically simple manner.

It may be provided that the pixel array comprises several rows or columns of pixels. In successive rows or columns, only pixels of the first set of pixels or pixels of the second set of pixels may be arranged alternately in each case. Alternatively, pixels of the first set of pixels and pixels of the second set of pixels may be arranged alternately in each row or column, in particular of the type that results in a checkerboard-like arrangement of the pixels of the first set of pixels and the pixels of the second set of pixels. The desired arrangement can be formed from individual VCSELs using suitable methods, for example stamping techniques, self-organization or pick & place.

It can be provided that all optoelectronic lasers of the pixel array are connected in parallel. In the low temperature range, the optoelectronic lasers of the first set of pixels then contribute essentially to the laser emission. In the higher temperature range, on the other hand, the optoelectronic lasers of the second set of pixels contribute essentially to the laser emission. The disadvantage of this is that the overall efficiency of the VCSEL array is approximately halved, since usually one half of the lasers does not contribute or contributes only slightly to the usable laser radiation (with a 50-50 split of the first and second set of pixels). Also, the exact voltages are difficult to control in manufacturing.

The optoelectronic lasers of the first set of pixels may be electrically controllable separately from the optoelectronic lasers of the second set of pixels. This can be achieved in a number of ways. For example, a substrate on which the VCSELs are arranged may comprise a chip, e.g., silicon-based or CMOS-based, that already includes a current source, in particular a switching transistor, per laser.

In other embodiments, the contacts of the optoelectronic lasers can be guided down through the substrate only by through-hole vias. The supply of the lines to the drivers is then organized via a PCB (printed circuit board) located under the chip in such a way that separate control of the different sets of pixels is achieved. In further embodiments, the optoelectronic lasers are interconnected on the surface of a carrier substrate by means of busbars. In this case and in other embodiments, either all optoelectronic lasers can be connected in parallel, optionally with their own driver, or partially in parallel and in series, e.g. to reduce the number of connection points and/or to increase the operating voltage and lower the resulting total currents.

The optoelectronic lasers can be VCSEL, μVCSEL, VEC-SEL or μVECSEL. Whenever VCSELs are mentioned herein, the respective subject matter may also refer to VCSELs, VECSELs or μVCSELs.

The optoelectronic device is particularly well suited for applications subject to widely varying ambient temperatures, for example on a motor vehicle.

A lidar system may include at least one optoelectronic device and an evaluation device for determining a distance to an object reflecting the emitted laser beams in dependence on laser beams detected by means of the receiving device.

A method for manufacturing an optoelectronic device may include forming a pixel array, which comprises a plurality of pixels on a carrier, wherein each pixel comprises at least one optoelectronic laser, in particular a VCSEL, and wherein in the method an electronic controller for driving the pixels is arranged and/or formed, in particular on the carrier, wherein for driving purposes the pixels of the pixel array are divided into several sets of pixels, and wherein the controller is configured such that it operates the sets of pixels in different, successive time intervals.

BRIEF DESCRIPTION OF THE DRAWINGS

The accompanying drawings serve to provide an understanding of non-limiting embodiments. The drawings illustrate non-limiting embodiments and, together with the description, serve for explanation thereof. Further non-limiting embodiments and many of the intended advantages will become apparent directly from the following detailed description. The elements and structures shown in the drawings are not necessarily shown to scale relative to each other. Like reference numerals refer to like or corresponding elements and structures.

DETAILED DESCRIPTION

Figure 1:
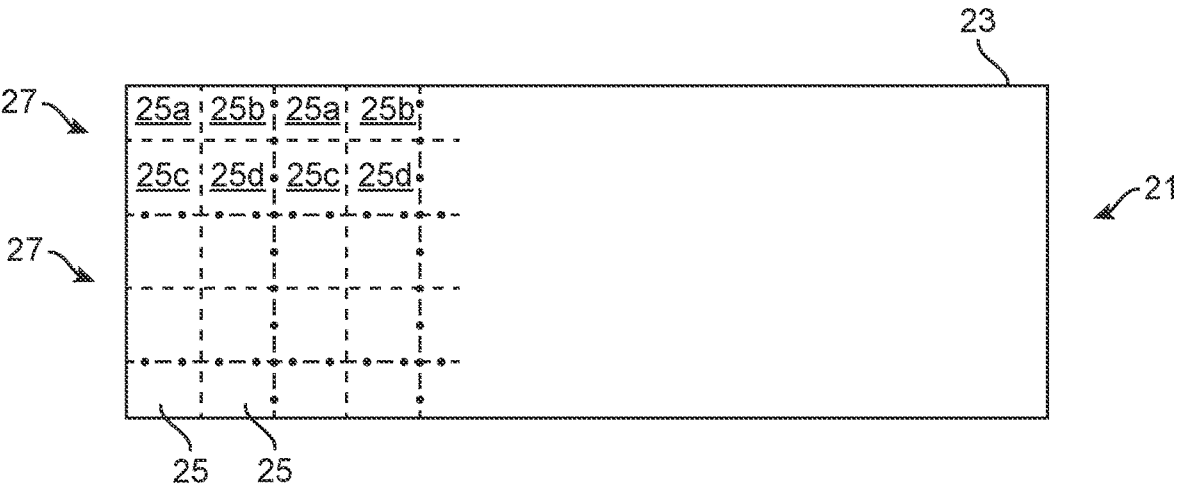
FIG. 1 a top view of a transmitting device of a variant of an optoelectronic device, FIG. 2 a top view of a target field of the device of FIG. 1, FIG. 3 an illustration of an optical system for a pixel of the transmitting device of the device of FIG. 1, FIG. 4a a top view of a transmitting device of a further variant of an optoelectronic device, FIG. 4b a top view of a receiving device for the transmitting device of FIG. 4a, FIG. 5a a further top view of the transmitting device of FIG. 4a, FIG. 5b a further top view of the receiving device of FIG. 4b, FIG. 6a a top view of a transmitting device of yet another variant of an optoelectronic device, FIG. 6b a top view of a receiving device for the transmitting device of FIG. 6a, FIG. 7a a top view of a transmitting device of yet another variant of an optoelectronic device, FIG. 7b a top view of a receiving device for the transmitting device of FIG. 7a, FIG. 8a a top view of a transmitting device of yet another variant of an optoelectronic device, FIG. 8b a top view of a receiving device for the transmitting device of FIG. 8a, FIG. 9a a top view of a transmitting device of yet another variant of an optoelectronic device, FIG. 9b a top view of a transmitting device of yet another variant of an optoelectronic device, FIG. 10 another top view of a transmitting device of yet another variant of an optoelectronic device, FIG. 11 an electronic circuit for driving optoelectronic lasers of a pixel of a transmitting device according to a variant of an optoelectronic device, FIG. 12 an alternative electronic circuit for driving optoelectronic lasers of a pixel of a transmitting device according to a variant of an optoelectronic device, FIG. 13 a cross-sectional view of a transmitting device according to a variant of an optoelectronic device, FIG. 14 a cross-sectional view of a transmitting device according to another variant of an optoelectronic device, FIG. 15 several possible configurations of pixels on a carrier, FIG. 16a a top view of a transmitting device of yet another variant of an optoelectronic device, FIG. 16b a top view of a transmitting device of yet another variant of an optoelectronic device.

FIG. 1 shows a top view of a part of a transmitting device 21 of a variant of an optoelectronic device. The transmitting device 21 comprises a pixel array 23, which is an array-like arrangement of pixels 25. Some pixels 25 are shown by way of example and, in particular, are bounded by dashed lines. Each pixel 25 of the pixel array 23 comprises at least one laser, which is in particular a VCSEL. The pixel array 23 is divided into a number N of segments 27. Boundaries between segments 27 are drawn via dash-dotted lines. In the example shown, each segment 27 comprises four pixels 25 arranged in a square arrangement, so that two pixels 25 of each row of the pixel array 23 are assigned to a segment 27 and a segment 27 extends over two rows. However, the segmentation shown in FIG. 1 is to be regarded only as an example.

In the transmitting device 21, the pixels 25 are divided into several sets of pixels. In the transmitting device 21 according to FIG. 1, four sets of pixels are provided, corresponding to the number of pixels 25 per segment. Furthermore, one pixel 25 from each segment 27 is assigned to each set of pixels. The transmitting device 21 is configured to operate the sets of pixels at different successive time intervals.

For example, pixels 25a located in a respective upper left segment are assigned with a first set of pixels, pixels 25b located in a respective upper right segment 27 are assigned with a second set of pixels, pixels 25c located in a respective lower left segment 27 are assigned with a third set of pixels, and pixels 25d located in a respective lower right segment 27 are assigned with a fourth set of pixels. The four sets of pixels are operated in different, successive time intervals. Thus, in a first time interval, for example, pixels 25a are operated while the remaining pixels are not operated. In a subsequent, second time interval, the pixels 25b are operated, in a further time interval, the pixels 25c are operated, and in yet a further time interval, the pixels 25d are operated. The sequence may be repeated in further, subsequent time intervals, or the order of operation of the sets of pixels may also change, thereby avoiding the problem of jamming when using the optoelectronic device in a lidar system, as has been described above.

The segmentation of the pixel array 23 of the transmitting device 21 and the assignment of pixels 25 to a respective set of pixels allows simultaneous operation of multiple pixels, namely the pixels of a respective set of pixels. Unlike separate, individual operation of each pixel 25 of the pixel array 23, this can reduce the overall exposure time for an image capture when used in a lidar system. For example, the pixel array 23 may comprise 600 by 200 pixels. Laser beams require approximately 1 µs to travel back and forth over a distance of 150 m (2×150 m corresponds to a light travel time of 1 µs). If each individual pixel 25 of the pixel array 23 is started separately in its own time interval, the total exposure time would be about 120 ms (600×200×1 µs=120 ms). By simultaneously driving the pixels 25 of a respective pixel set as described above, this exposure time can be reduced, as will be explained in more detail below. A further advantage is that due to the segmentation of the pixel array, the illumination can be carried out differently depending on the respective solid angle, for example with regard to wavelength, pulse shape, power, etc.

In the pixel array 23 shown in FIG. 1, each pixel 25 may comprise a cross-sectional area of 40 µm by 40 µm, and may contain, for example, 1 to 5 VCSELs. The pixel array may further comprise, for example, a width of 24 mm and a height of 8 mm, so that it comprises a total of 600 by 200 pixels.

Figure 2:
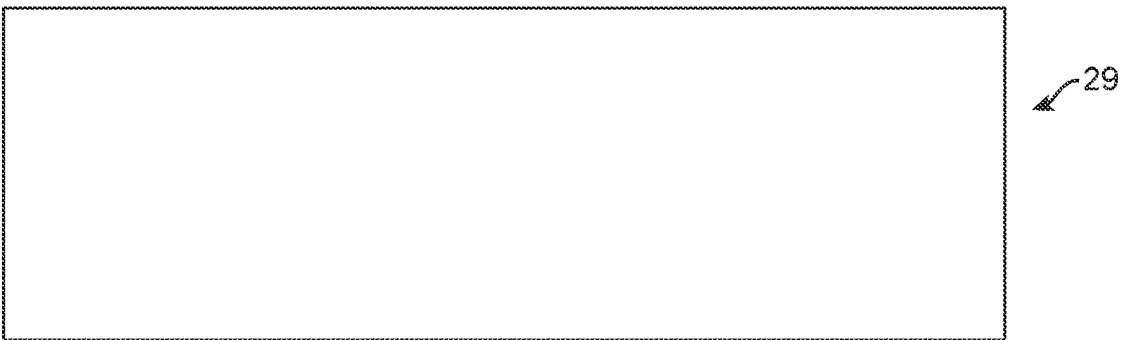

The field-of-illumination (FOI) 29 shown in a plan view in FIG. 2 may be located, for example, at a distance of 200 m in front of the pixel array 23 of the transmitter device 21 of FIG. 1. Using a corresponding projection optics, the target field 29 can have a width of 231 m and a height of 70.6 m, for example. A pixel 25 is projected onto an area of approximately 0.349 m by 0.349 m. These dimensions for the target field 29 are to be regarded only as an example. In a non-limiting embodiment, the aspect ratio of the pixel array, for example 24:8, is maintained in the target field. The dimensions of the pixel array can thus be projected or scaled up into the target field by means of distortion-free projection optics.

Figure 3:
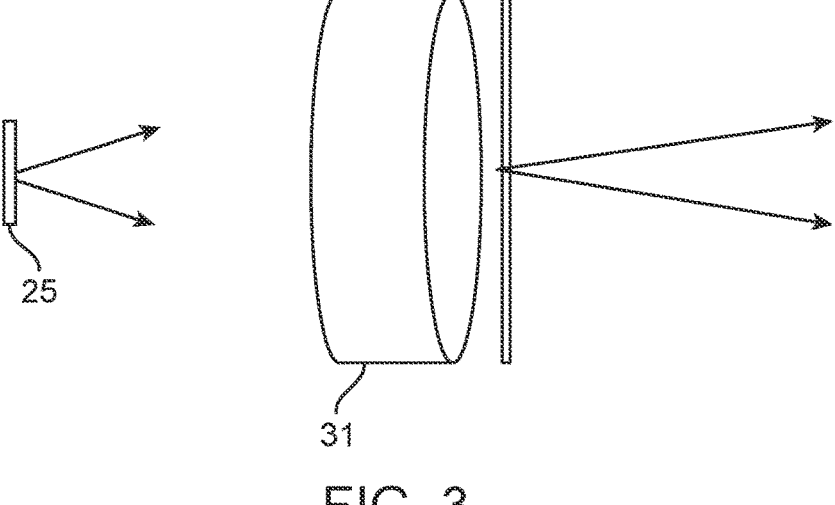

The optical system shown in simplified form in FIG. 3 comprises at least one lens 31 in front of a respective pixel 25. The lens 31 is arranged at a distance of its focal length in front of a respective pixel 25. In order to maintain the intensity of the laser radiation emitted by the pixel, the lens 31 should, according to one example, have a lens diameter of more than 10.3 mm and a focal length of 23 mm, in particular also in order to achieve an illumination of the target field as described with reference to FIG. 2. If a collimator lens (not shown) is used in front of the pixel 25, the required diameter of the lens 31 can be reduced, for example to a value greater than 4.12 mm.

Figures 4, 5:
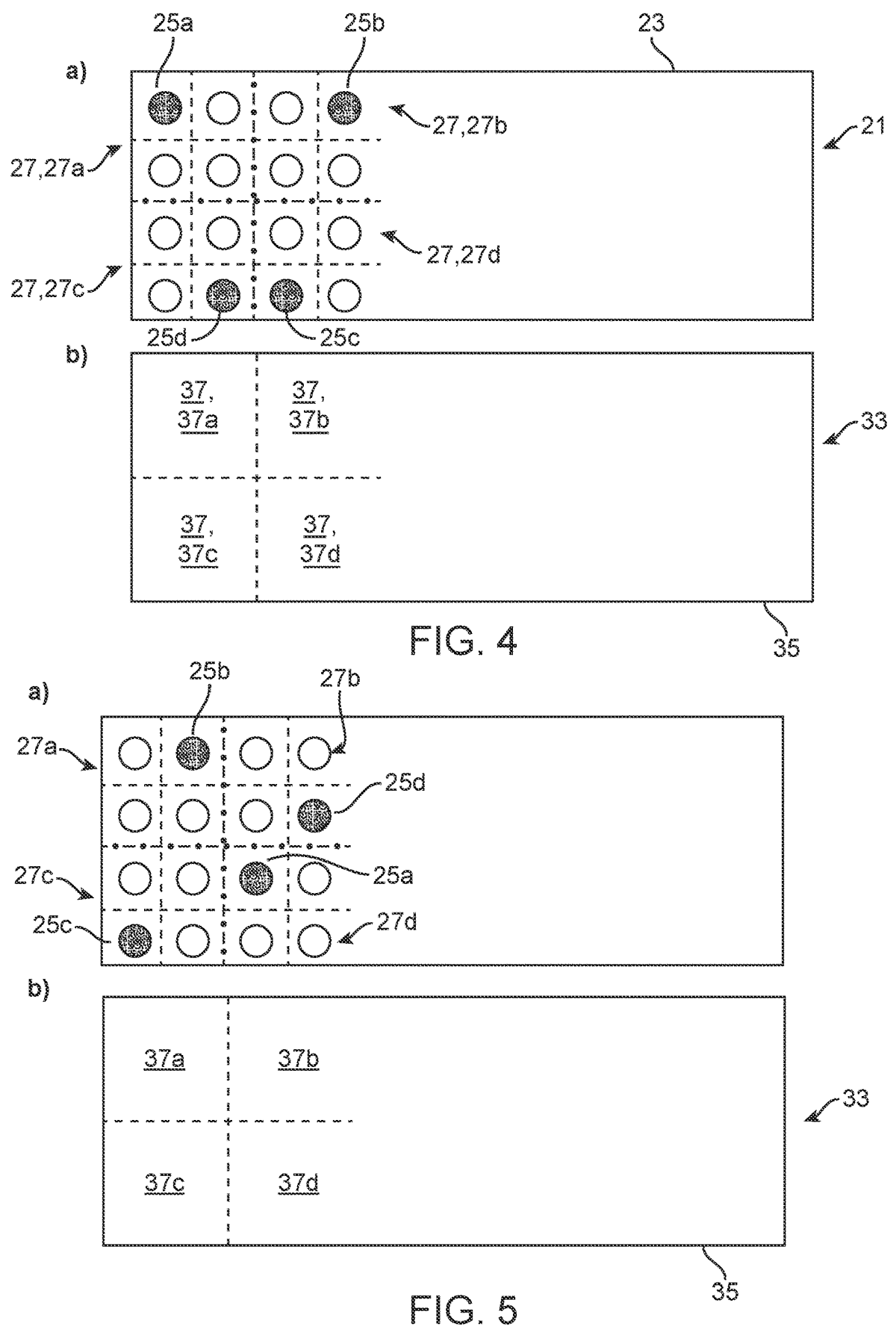

The transmitting device 21 shown in top view in FIG. 4a corresponds essentially to the transmitting device of FIG. 1. Four segments 27 of the pixel array 23 are shown, each segment 27 in turn comprising four pixels. One pixel 25 of each segment 27 is assigned to a respective set of pixels. For example, from the upper left segment 27a, pixel 25a is assigned to a first set of pixels, from the upper right segment 27b, pixel 25b is assigned to the first set of pixels, from the lower left segment 27c, pixel 25d is assigned to the first set of pixels, and from the lower right segment 27d, pixel 25c is assigned to the first set.

As has already been explained above with reference to FIG. 1, the transmitting device 21 according to FIG. 4a is configured to operate the sets of pixels at different, successive time intervals. Thus, in one time interval, the pixels assigned with the first set of pixels are operated, while the remaining pixels are not operated.

FIG. 4b shows a top view of a receiving device 33 comprising a two-dimensional detection field 35 divided into a plurality of detection areas 37. The number of detection areas 37 corresponds to the number of segments of the pixel array 23 according to FIG. 4a. In each case, a detection area 37 is assigned to a segment 27 in such a way that the detection area 37 is provided for detecting back-reflected laser beams originating from the assigned segment 27. In particular, the assignment can also take place in a detection unit (not shown) arranged downstream of the receiving device 33, which processes and/or evaluates the signals detected in a respective detection area 37.

For example, the detection area 37a may be assigned to the segment 27a, the detection area 37b may be assigned to the segment 27b, the detection area 37c may be assigned to the segment 27c, and the detection area 37d may be assigned to the segment 27d. In each detection area 37 at least one pixel for detecting laser beams may be provided. The resolution capacity of the receiving device 33 can thus be worse than the resolution of the transmitting device 21. However, the number of time steps required for an image acquisition and for scanning a target field (cf. FIG. 2) is reduced by the number of detection areas. If, for example, 600 pixels per 200 pixels in the pixel array 23 were used in an individual time interval, this would result in a relatively long exposure time. This is reduced by the number of detection areas 37 of the receiving device 33 and can thus be significantly shortened if a corresponding number of detection areas 37 are used.

FIG. 5a shows the transmitting device 21 of FIG. 4a. Here, in a further, second time interval, the pixels assigned to a second set of pixels are in operation. For example, from the upper left segment 27a, pixel 25b is assigned to the second set of pixels, from the upper right segment 27b, pixel 25d is assigned to the second set of pixels, from the lower left segment 27c, pixel 25c is assigned to the second set of pixels, and from the lower right segment 27d, pixel 25a is assigned to the second set. All other pixels not assigned to the second set of pixels are not in use during the second time interval. Back-reflected laser radiation can again be detected by the receiving device 33 shown in FIG. 5a. Each detection area 37 detects laser radiation from the respective associated segment 27.

Figures 6, 7:
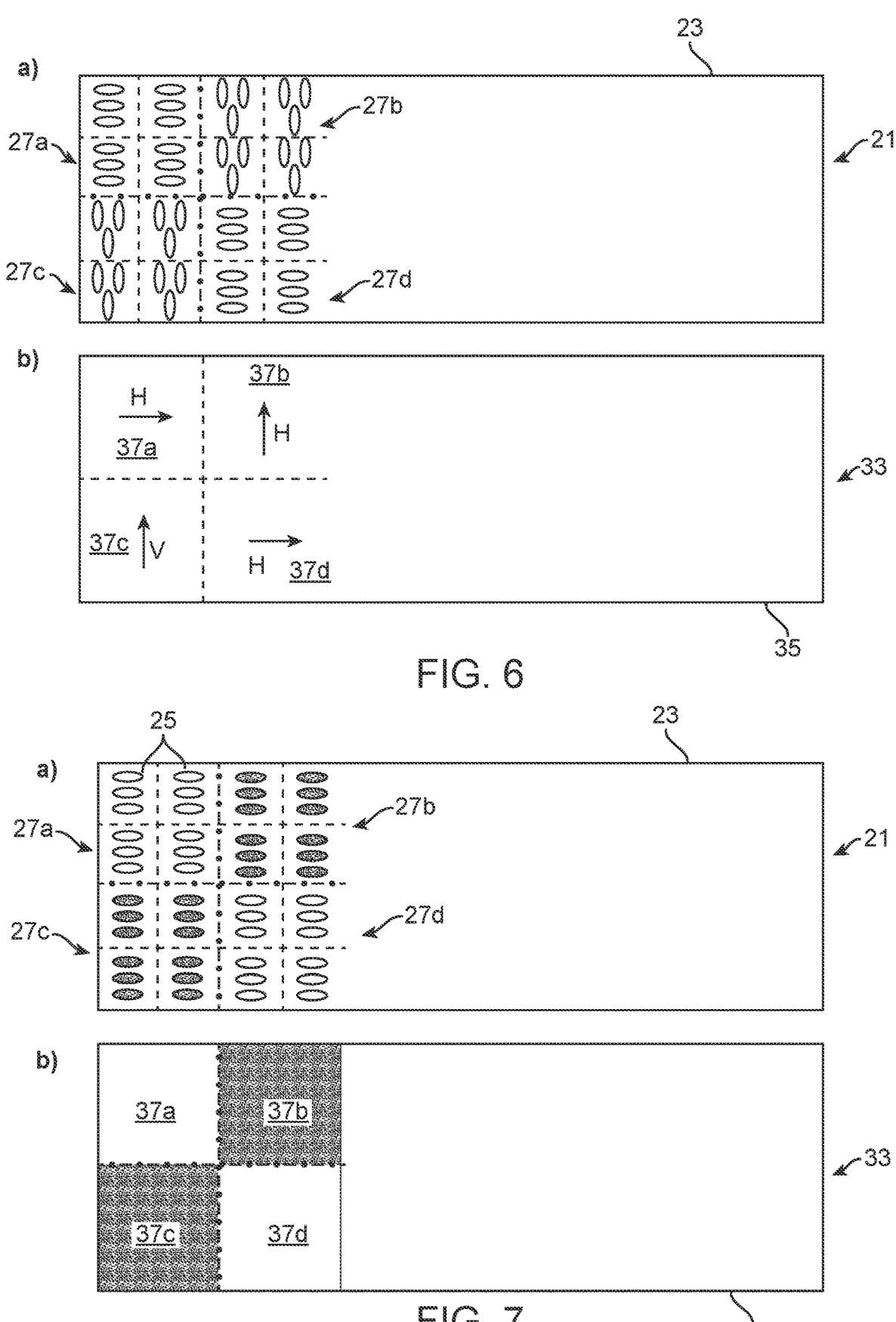

In the variant of FIG. 6a, the pixels in the segments 27a and 27d emit laser beams with a first polarity. For example, the first polarization can be a linear polarization in a horizontal direction H, cf. the detection areas 37a and 37d of the detection field 35 of the receiving device 33 assigned to the segments 27a and 27d according to FIG. 6b. In contrast, the pixels 25 of segments 27b and 27c emit laser beams with a second polarization, which may be a linear polarization in the vertical direction V, for example. A corresponding vertical polarization direction V is drawn in the detection areas 37c and 37b.

The detection area 37a assigned with the segment 27 comprises a polarization filter (not shown) which transmits light emitted in the horizontal polarization direction H. The polarization filter of the detection area 37a is thus adapted to the polarization direction of the laser beams emitted from the segment 27a. In contrast, the polarization filter of the detection region 37a blocks the laser light having a vertical polarization direction V from the segments 27b and 27c.

In the corresponding manner, the other detecting areas are also provided with a polarization filter adapted to the polarization of the laser beams emitted from the respective assigned segment of the emitting device. In contrast, the detection areas adjacent to the respective detection area via a longitudinal side comprise polarization filters that allow light to pass in an orthogonal polarization direction.

By using segments 27a to 27d which, when the segments 27 are viewed in a row or a column of the pixel array 23, always emit alternating laser light with horizontal or vertical polarization, and by equipping the associated detection areas 37a to 37d with correspondingly adapted polarization filters, the stray light detected in the individual detection areas 37a to 37d, which originates, for example, from laser radiation from unassigned segments, can be significantly reduced. Detection of other interfering light, such as solar background radiation and radiation from other lidar sources, can also be reduced.

In the variant of FIG. 7a, the pixel array 23 of the transmitting device 21 is designed in such a way that the pixels of segments that are directly adjacent to each other in a row or column of the pixel array 23 emit laser beams with, in particular, slightly different wavelengths. For example, the pixels 25 of the segment 27a may emit laser beams at a wavelength of at least approximately 939 nm. The same applies to the pixels 25 of segment 27d. In contrast, the pixels 25 of segments 27b and 27c can emit laser beams at a wavelength of at least approximately 941 nm. The VCSELs for emitting the different wavelengths can, for example, origin from different wafers. These specific wavelength are again only to be seen as an example.

According to another example, a difference in wavelengths of 20 nm or 25 nm or 30 nm or 35 nm or 40 nm or more would be advantageous. The wavelengths can also be very different from each other. For example, the first wavelength may be at least approximately 850 nm and the second wavelength may be at least approximately 905 nm or 1600 nm.

As indicated in FIG. 7b, the detection areas 37a to 37d assigned to the respective segments 27a to 27d comprise suitably designed spectral filters which are adapted to the wavelengths of the laser beams. For example, the detection area 37a comprises a spectral filter, for example a bandpass filter, through which the laser beams at 939 nm emitted by the assigned segment 27a can pass so that these laser beams can be detected by the segment 37a. In contrast, the spectral filter blocks light of other wavelengths and in particular at 941 nm. Thus, the laser beams emitted by segments 27b and 27c cannot be detected by detection field 37a. The detection of unwanted stray light can thus be reduced.

The remaining detection areas 37b to 37d are equipped with corresponding filters which are adapted to the wavelength of the assigned segment 27b to 27d.

Figures 8, 9:
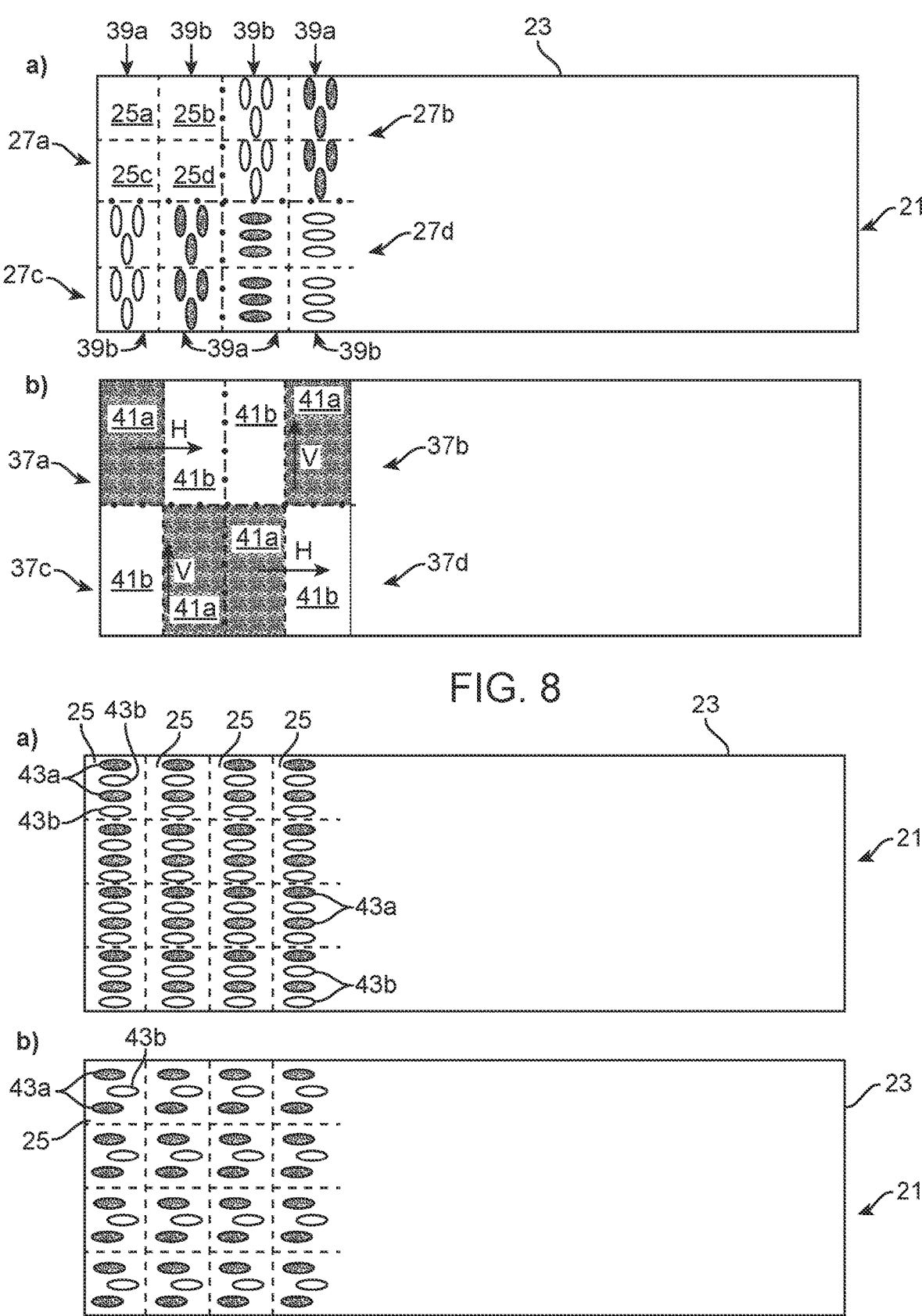

In the variant according to FIG. 8a, adjacent segments 27a to 27d in a row or column of the pixel array 23 emit laser beams with different polarization directions. In particular, a segment emits laser beams with horizontal polarization direction H, while the segments adjacent to the segment in a row or a column emit laser beams with vertical polarization direction V (cf. the polarization directions in the detection areas 37a to 37d of the detection field 35 of the receiving device 33 according to FIG. 8b). For example, the pixels of segment 27a emit laser beams with horizontal polarization direction H, while the pixels of segment 27b, which is located in the row of pixel array 23 adjacent to segment 27a, emit laser beams with vertical polarization direction V. Segment 27c, located in the same column of pixel array 23 below segment 27a, also emits laser beams with vertical polarization direction V. On the other hand, the segment 27d lying next to it in the same row emits laser beams with horizontal polarization direction H.

The detection areas 37a to 37d of the detection field 35 of the receiving device 33 are equipped with corresponding polarization filters, so that the detection areas 37a and 37d can detect laser beams with horizontal polarization direction H, and so that the detection areas 37b and 37c can detect laser beams with vertical polarization direction V.

In the variant of FIG. 8a, the segments are further divided into sub-segments. In a non-limiting embodiment, each segment is subdivided into two sub-segments, each sub-segment having the same number of pixels assigned therewith. The sub-segments differ in that they emit light of different wavelengths. For example, segment 27a is divided into sub-segments 39a and 39b. Sub-segment 39a comprises pixels 25a and 25c, and sub-segment 39b comprises pixels 25b and 25d of segment 27a. Similarly, segments 27b, 27c, and 27d are each divided into two sub-segments 39a and 39b that emit light of different wavelengths. For example, pixels 25a and 25c assigned with sub-segment 39a emit light at a wavelength of 939 nm, while pixels 25b and 25d assigned with sub-segment 39b emit light at a wavelength of 941 nm. It should be noted that the arrangement of segments 39a and 39b may change from segment to segment. Thus, the pixels capable of emitting light at one wavelength may be arranged in different areas from segment to segment.

In the receiving device 33 according to FIG. 8a, each detection area 37a to 37d is divided into two sub-areas 41a and 41b, which are assigned to a respective sub-segment 39a and 39b and have a correspondingly adapted spectral filter to allow light from the assigned sub-segment to pass and to block light from the respective non-assigned sub-segment.

In the variant according to FIGS. 8a and 8b, the detection of stray light in the individual detection areas 37 can be further reduced by the measures described above, in particular by using and detecting laser beams with different wavelengths and different polarization.

With reference to FIG. 9a, a variant of an optoelectronic device is described in which the pixel array 23 of the transmitting device 21 comprises a plurality of pixels 25 which are separated from one another by dashed lines in FIG. 8a. Each pixel 25 comprises a plurality of optoelectronic lasers, such as VCSELs. The VCSELs of each pixel 25 are again divided into two groups of VCSELs that differ in their temperature operating ranges.

As shown in FIG. 9a for the upper left pixel 25, it comprises a first group of VCSELs 43a whose temperature operating range is, for example, in the range of −40° C. to +40° C. In addition, the pixel 25 comprises a second group of VCSELs 43b whose temperature operating range is, for example, between +40° C. and +120° C. The other pixels 25 of the pixel array 23 are provided with a corresponding first group of VCSELs and a corresponding second group of VCSELs. Each pixel 25 of the pixel array 23 thus comprises VCSELs that allow laser operation in a temperature range of −40° C. to +120° C. as required by automotive requirements. The pixel array 23 of the transmitter 21 according to FIG. 9a is thus particularly suitable for use in automotive applications.

In the variant of FIG. 9b, each pixel 25 also comprises a first group of VCSELs 43a and a second group of VCSELs 43b. In this case, two VCSELs 43a and one VCSEL 43b are provided. This is to be considered as an example only, especially since one VCSEL 43a and two VCSELs 43b may also be provided in reverse. The VCSELs 43a and 43b are arranged slightly offset with respect to the centre line of a column, as shown in FIG. 9b.

Figure 10:
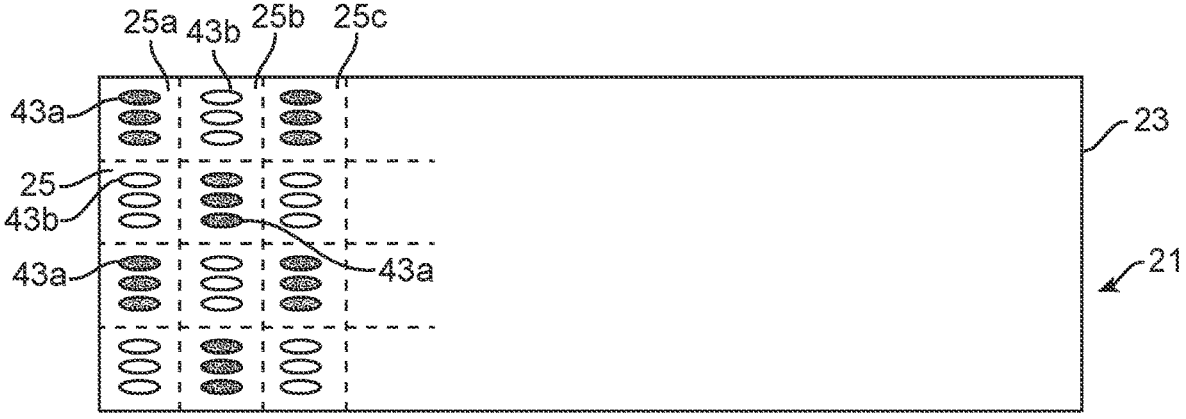

In the variant of FIG. 10, lasers with different temperature operating ranges are arranged from pixel 25 to pixel 25. For example, the top left pixel 25a comprises only VCSEL 43a of the first group of VCSELs 43a, while the pixel next to it comprises only VCSEL 43b of the second group of VCSELs 43b. In particular, in each row of the pixel array 23, either the first group of VCSELs 43a or the second group of VCSELs 43b may be arranged alternately from pixel to pixel. The same applies to each column of the pixel array. In each column of the pixel array 23, therefore, either the first group of VCSELs 43a or the second group of VCSELs 43b can be arranged alternately from pixel to pixel. This simplifies fabrication, since identical VCSELs are arranged in each pixel.

Figure 11:
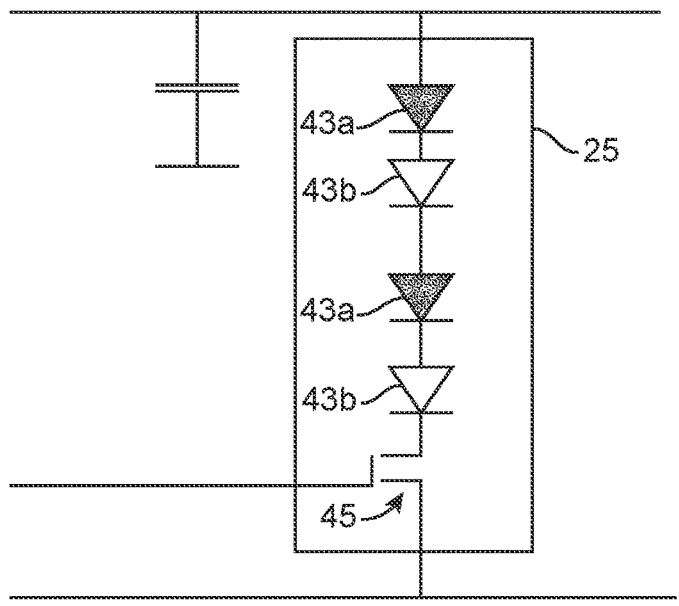

FIG. 11 shows an electronic circuit for driving the VCSELs 43a, 43b of a pixel 25. As shown, the VCSELs 43a, 43b of both the first and second groups of VCSELs are connected in series. Thus, a common, simultaneous driving of the VCSELs 43a, 43b of the pixel 25 takes place. By means of the transistor 45, an electric current is switched on or off through the VCSELs 43a, 43b in order to operate or not to operate the VCSELs. Depending on the temperature range, either the VCSELs of the first group of VCSELs 43a or the VCSELs of the second group of VCSELs 43b are in the optimal operating range, while the other group of VCSELs does not contribute or contributes only slightly to the emission spectrum. A simultaneous emission of the first and second group of VCSELs 43a and 43b, for example in the transition range at 40° C. between the temperature operating ranges of the two VCSEL groups, is incidentally unproblematic. The circuit shown in FIG. 11 is simple to implement and does not require a temperature sensor.

Figure 12:
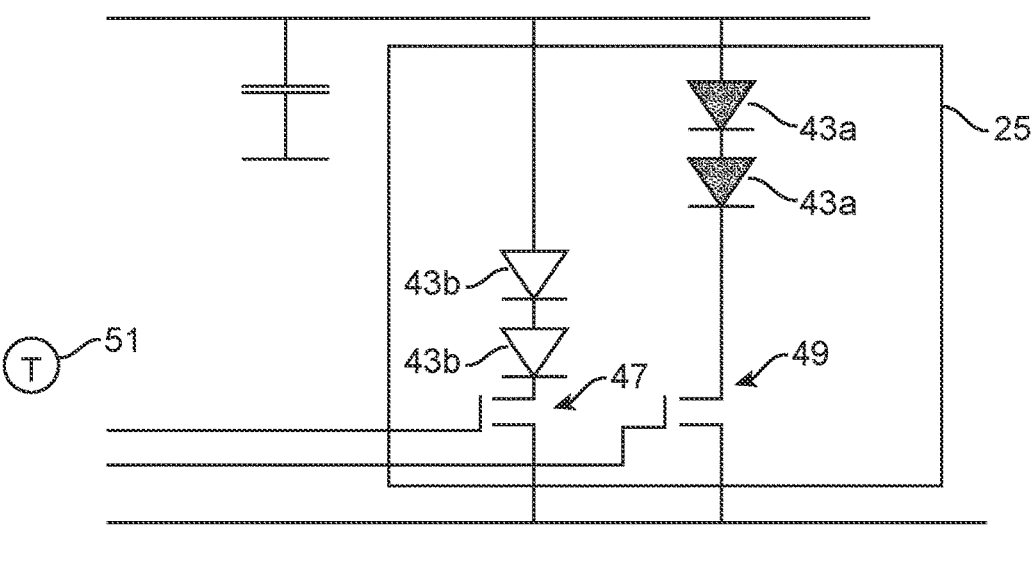

FIG. 12 shows an electronic circuit for separate control of the VCSELs of the first group of VCSELs 43a and the VCSELs of the second group of VCSELs 43b. Each group of VCSELs is arranged in a separate row running parallel to each other, as shown in FIG. 12. Depending on a temperature measured by a temperature sensor 51, either the transistor 47 or the transistor 49 is energized to operate either the VCSEL 43a of the first group of VCSELs or the VCSEL 43b of the second group of VCSELs. The temperature sensor 51 may be an ambient temperature sensor such as is normally already present in a modern motor vehicle.

Figure 13:
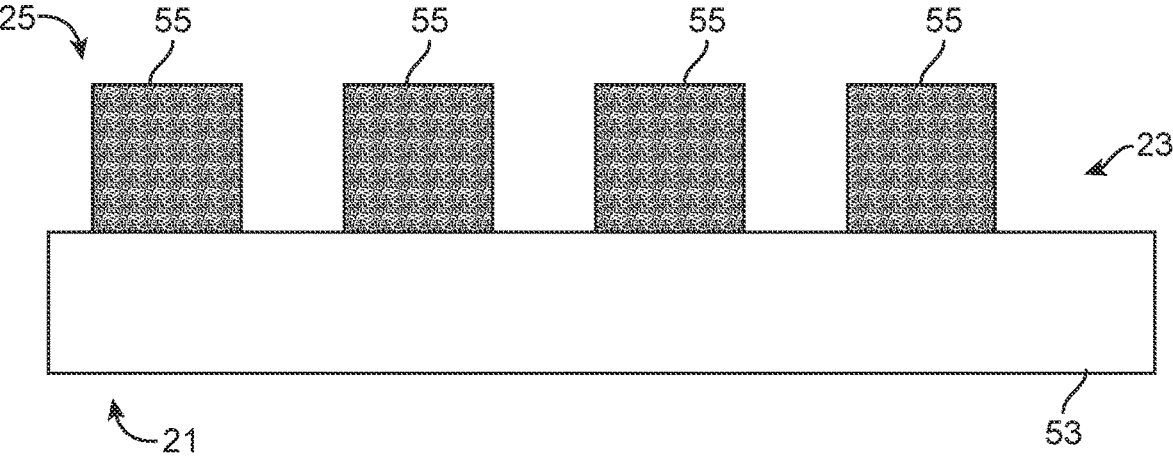

FIG. 13 shows in cross-section a region of a transmitting device 21, in which the pixel array 23 comprises a carrier 53 on which pixels 25, each with at least one VCSEL 55, are arranged in an array-like manner. The carrier 53 may comprise at least one integrated circuit, for example based on silicon, for driving the VCSEL 55. The circuit can comprise logic elements as well as driver elements, such as transistors, in order to be able to operate the VCSEL 55 in a pulse mode, for example. The carrier 23 can in particular be a so-called silicon backplane.

The VCSEL 55 can be arranged, in particular as µVCSEL (microscale VCSEL), on the carrier 23 by means of parallel chip transfer. Alternatively, the VCSEL 55 can be "bonded" directly to the carrier 53 as a wafer by means of wafer bonding.

Figure 14:
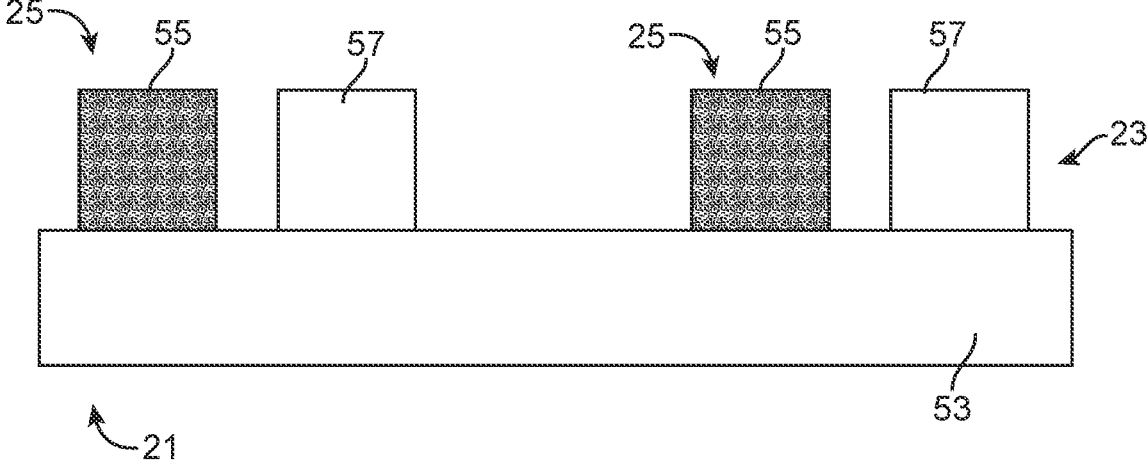

In the embodiment of FIG. 14, the carrier 53 is passive. A controller 57 is assigned to each pixel 25, which is arranged on the carrier 23 and by means of which the VCSEL 55 of the pixel 25 is operated. Alternatively, it can also be provided that several pixels 25 are assigned to a controller 57.

The VCSEL 55, in particular as µVCSEL, and the controllers 57 can be arranged on the passive carrier 23 by means of parallel chip transfer. The controllers 57 can be designed as integrated circuits.

Figure 15:
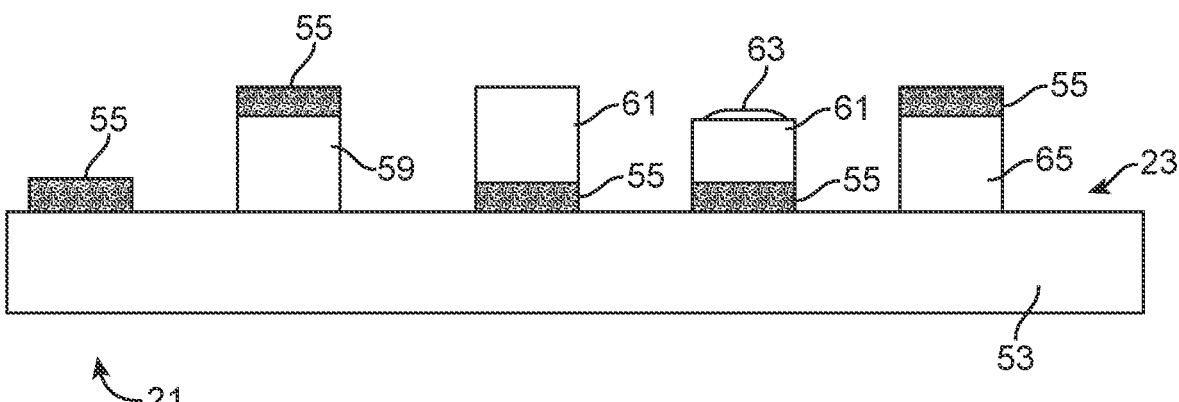

FIG. 15 serves to illustrate different possibilities for arranging VCSELs on the carrier 53. For example, the VCSEL 55, in particular as µVCSEL, can be arranged substrate-free on the carrier 53. In one embodiment, the VCSEL 55 can be arranged on the carrier 53 by means of an auxiliary substrate 59. The auxiliary substrate can be formed, for example, by "rebonding" a VCSEL wafer onto a Si, Ge, SiC or sapphire substrate and subsequently removing the original growth substrate.

In another embodiment, the VCSEL 55 can be arranged in a so-called backside arrangement on the carrier 53. The substrate 61 lying above the VCSEL 55 can, for example, consist of GaAs. Light decoupling at, for example, 940 nm through the GaAs substrate is possible.

In yet another variant, a lens 63 can be formed on the upper side of the substrate 61, for example of GaAs, for beam collimation, for example.

In yet another variant, a VCSEL 55 can be arranged on the carrier 53 by means of a substrate 65, for example GaAs. The substrate 65 is located between the carrier 53 and the VCSEL 55.

In the optoelectronic devices described above, the transmitting devices 21 are configured to transmit laser beams, a respective transmitting device 21 comprising an array 23 of pixels 25 and each pixel 25 of the pixel array 23 comprising at least one laser, in particular a VCSEL. A receiving device 33 is further provided for detecting laser beams reflected back, in particular, from objects. The pixels 25 of the pixel array 23 may be divided into a plurality of sets of pixels, and the respective transmitting device 21 is configured to operate the sets of pixels at different, successive time intervals.

Figure 16:
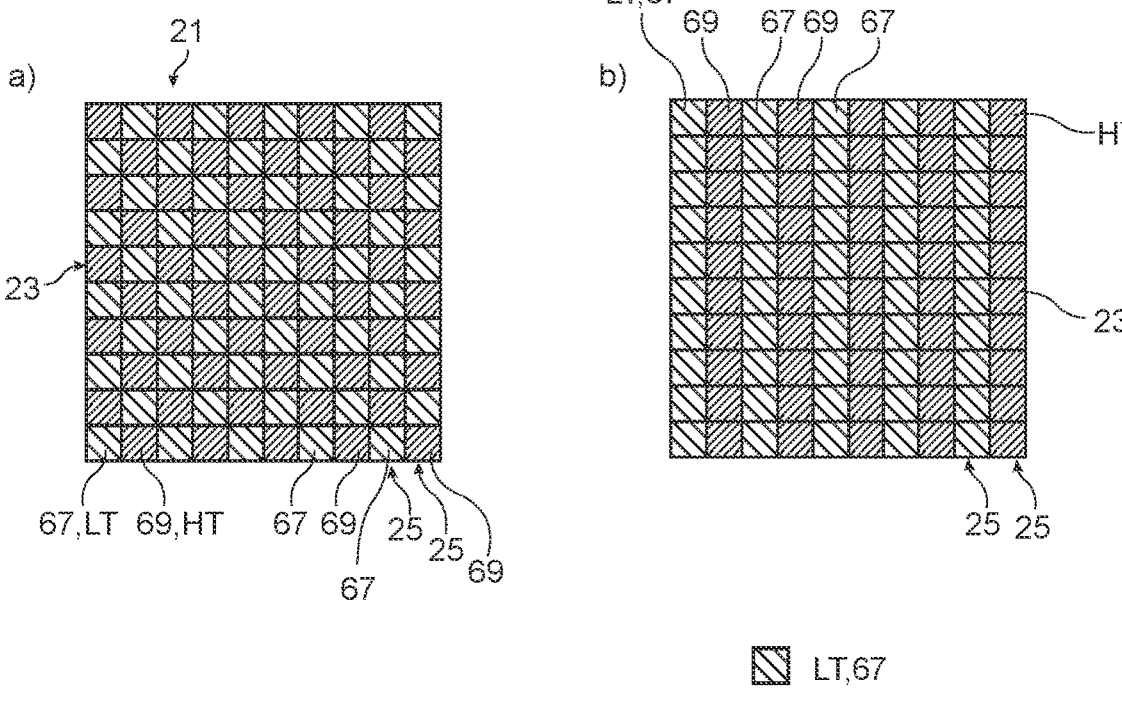

The top view of a transmitting device 21 of a variant of an optoelectronic device shown in FIG. 16a comprises a pixel array 23. Each pixel 25 of the pixel array 23 comprises an optoelectronic laser 25 configured as a VCSEL. Alternatively, it may be a respective µVCSEL, VECSEL or µVECSEL.

The pixels 25 of the pixel array 23 are divided into at least a first set of pixels 67 and a second set of pixels 69, wherein in the example of FIG. 16a the pixels 67, 69 are arranged in chess board like pattern.

In this regard, each pixel of the first set of pixels 67 comprises a VCSEL configured for laser operation in a first, low temperature range (LT for "low temperature"), for example between −40° C. and +25° C. Each pixel of the second set of pixels 69, on the other hand, comprises at least one VCSEL that is configured for laser operation in a second, higher temperature range (HT for "high temperature"), for example, between 25° C. and +90° C.

In contrast to the variant according to FIG. 16a, in the transmitting device 21 shown in FIG. 16b in plan view, the pixels 25 of the first and second set of pixels 67, 69 are arranged in different columns of the pixel array 23.

The chess board like or column-like arrangement of the first and second sets of pixels 67, 69 in the respective pixel array 23 shown in FIGS. 16a, b is to be seen only as an example. Other arrangements of the first and second sets of pixels 67, 69 are also possible. Also, splitting the pixels in half into the pixels of the first set of pixels 67 and in another half into the pixels of the second set of pixels 69 is to be seen as an example. Other splits are also possible.

Since the VCSELs of the first set of pixels 67 are configured for laser operation in the first, lower temperature range, and the VCSELs of the second set of pixels 69 are configured for laser operation in a second, higher temperature range, an optoelectronic device with a transmitting device according to FIG. 16a or FIG. 16b is suitable for use in applications with strongly varying ambient temperature, for example in a lidar system of a vehicle.

The first and second temperature ranges may partially overlap or directly adjoin each other, in particular without overlapping.

For the electrical control of the VCSELs, it can be provided that the VCSELs of the first and second set of pixels 67, 69 are connected in parallel. This allows all VCSELs to be operated simultaneously. At low temperatures, the VCSELs of the first set of pixels 67 then contribute at least substantially to the laser emission. At higher temperatures, on the other hand, the VCSELs of the second set of pixels 69 contribute at least essentially to the laser emission.

Alternatively, the VCSELs of the first set of pixels 67 can be controlled separately from the VCSELs of the second set of pixels 69. This can be achieved, for example, by a substrate on which the VCSELs are deposited having a chip, e.g. silicon-based or CMOS-based, which contains a current source, in particular a switching transistor, per optoelectronic laser. Thus, a separate operation of the different sets of pixels can be achieved by appropriate control of the switching transistors. Other possibilities for separate control of the pixel sets are also conceivable.

Figure 17:
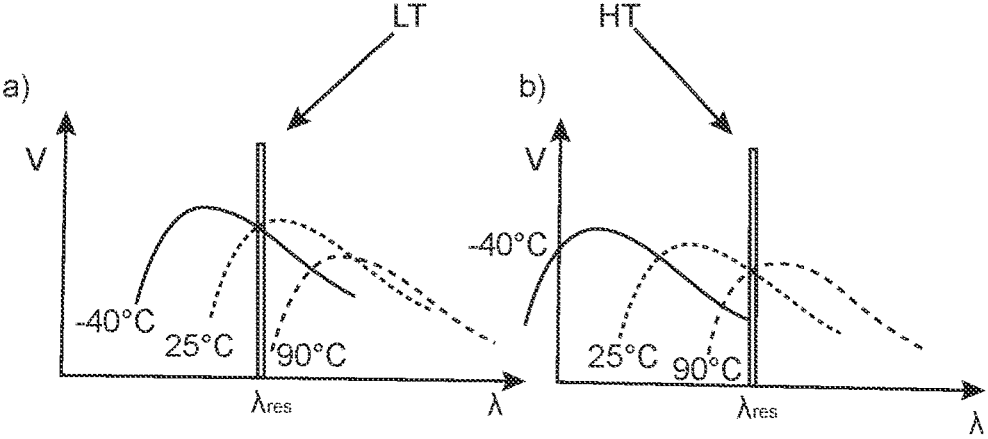
FIG. 17a shows, for a VCSEL optimized for laser operation in a low, first temperature range, exemplary gain curves versus wavelength for the temperatures of −40° C., 25° C. and 90° C., as well as an emission wavelength predetermined by the resonator of the VCSEL.
FIG. 17b shows exemplary gain curves versus wavelength for the temperatures of −40° C., 25° C., and 90° C. for a VCSEL that is optimized for laser operation in a higher, second temperature range, as well as an emission wavelength specified by the resonator of the VCSEL.

The VCSELs of the first set of pixels 67 and the second set of pixels 69 may originate from different wafers. The wafers may be designed such that the VCSELs on the wafers have at least substantially the same emission wavelength $\lambda_{res}$ due to the design of their mirror layers and the length of the cavity between the mirror layers in which the active region is located. However, the VCSELs from the two wafers may differ in that the wavelength position of the gain spectrum differs at the same temperature, as shown in FIGS. 17a and b based on the gain curves at –40° C., 25° C., and 90° C. The VCSELs of one wafer are thus optimized for laser operation in the lower, first temperature range, as FIG. 17a shows, while the VCSELs of the other wafer are optimized for laser operation in the upper, second temperature range, as FIG. 17b shows.

Optimization to a temperature range that lies between a lower temperature, e.g., –40° C., and an upper temperature, e.g., +25° C., can be achieved by having the emission wavelength Ares pass at least approximately through the intersection of the gain curves at the lower and upper temperatures, as shown in FIGS. 17a and b, respectively.

REFERENCE LIST 21 transmitting device
23 pixel array
25, 25a-25d pixel
27, 27a-27d segment
29 target field (Field of Illumination FOI)
31 lens
33 receiving device
35 detection field
37, 37a-37d detection area
39a, 39b sub-segment
41a, 41b sub-area
43a first group of VCSELs
43b second group of VCSELs
45 transistor
47 transistor
49 transistor
51 temperature sensor
53 carrier
55 VCSEL
57 controller
59 auxiliary substrate
61 substrate
63 lens
65 substrate
67 first set of VCSELs
69 second set of VCSELs
H horizontal direction
V vertical direction
$\lambda_{res}$ emission wavelength

The invention claimed is:

1. An optoelectronic device for the detection of obstacles and/or for distance measurement, wherein the optoelectronic device comprises:
a transmitting device for emitting laser beams, wherein the transmitting device comprises an array of pixels, wherein each pixel of the pixel array comprises at least one laser,
wherein the pixels of the pixel array are divided into several sets of pixels,
wherein each of the several sets of pixels comprises pixels that are spatially distributed across the array of pixels,
wherein the transmitting device is configured to operate the sets of pixels at different, successive time intervals, such that during operation of a first set of pixels, the pixels of the other sets of pixels are not operated, wherein the transmitting device is configured to provide a simultaneous illumination of an entire target area via the laser beams from the respective pixels operated in a time interval,
wherein the sets of pixels are activated in a random sequence, such that the sets of pixels are operated in a changing order in the different, successive time intervals, and
wherein the pixel array comprises a plurality of segments each comprising a localized group of pixels, wherein each set of pixels comprises one pixel from each group of pixels.

2. The optoelectronic device according to claim 1, wherein each segment comprises a same number of pixels and a number of sets of pixels corresponds to the number of pixels per segment.

3. The optoelectronic device according to claim 1 further comprising a receiving device for detecting laser beams;
wherein the receiving device comprises a two-dimensional detection field subdivided into a number of detection areas, wherein each detection area is configured to detect laser beams of the transmitting device.

4. The optoelectronic device according to claim 3, wherein the number of detection areas corresponds to a number of segments into which the pixel array is subdivided, wherein one detection area in each case is assigned to one segment in each case in such a way that the detection area is provided for detecting back-reflected laser beams originating from the assigned segment.

5. The optoelectronic device according to claim 3, wherein each detection area comprises at least one pixel for detecting the laser beams.

6. The optoelectronic device according to claim 3, wherein each detection area comprises at least one polarization filter adapted to a polarization of the laser beams emitted by the pixels of the assigned segment.

7. The optoelectronic device according to claim 3, wherein each detection area comprises at least one spectral filter adapted to a wavelength of the laser beams emitted by the pixels of the assigned segment.

8. The optoelectronic device according to claim 1, wherein all pixels of the same segment of the pixel array emit laser beams with the same polarization and/or the same wavelength.

9. The optoelectronic device according to claim 1, wherein the pixels of at least a first segment of the pixel array emit laser beams with a first polarization,
wherein the pixels of at least one second segment of the pixel array emit laser beams with a second polarization,
wherein the first and second polarization are different.

10. The optoelectronic device according to claim 1, wherein the pixels of at least a first segment of the pixel array emit laser beams with a first wavelength,
wherein the pixels of at least one second segment of the pixel array emit laser beams with a second wavelength,
wherein the first wavelength and the second wavelength are different.

11. The optoelectronic device according to claim 1, wherein the segments of the pixel array form at least two rows, wherein each row comprises at least two pixels.

12. The optoelectronic device according to claim 11, wherein the pixels of a first segment of the pixel array emit laser beams with a polarization different from the polarization of the laser beams emitted by the pixels of at least one second segment, wherein the second segment is arranged adjacent to the first segment in the same row or the row below.

13. The optoelectronic device according to claim 11, wherein the pixels of a first segment of the pixel array emit laser beams with a wavelength different from the wavelength of the laser beams emitted by the pixels of at least one second segment, wherein the second segment is arranged adjacent to the first segment in the same row or the row below.

14. The optoelectronic device according to claim 1, wherein at least one pixel comprises at least two lasers having different temperature operating ranges, wherein the temperature operating range of at least one of the lasers of a pixel lies in a first interval, and wherein the temperature operating range of at least one other laser of the pixel lies in a second interval.

15. The optoelectronic device according to claim 14, wherein the at least two lasers of a pixel are operable together, or that in dependence of a current temperature the at least one laser is operable in whose temperature operating range the current temperature lies.

16. The optoelectronic device according to claim 1, wherein the pixels of the pixel array are divided into at least a first set of pixels and a second set of pixels, wherein each pixel of the first set of pixels comprises at least one optoelectronic laser configured for laser operation in a first temperature range, and wherein each pixel of the second set of pixels comprises at least one optoelectronic laser configured for laser operation in a second temperature range.

17. The optoelectronic device according to claim 16, wherein a respective optoelectronic laser comprises a resonator arrangement and an active zone, wherein the active zone is embedded in the resonator arrangement.

18. The optoelectronic device according to claim 17, wherein the resonator arrangements of the optoelectronic lasers of the first set of pixels and the resonator arrangements of the optoelectronic lasers of the second set of pixels are at least substantially similarly configured and/or dimensioned.

19. The optoelectronic device according to claim 17, wherein the active zones of the optoelectronic lasers of the first set of pixels and the active zones of the optoelectronic lasers of the second set of pixels are differently configured and/or dimensioned, wherein the active zones of the optoelectronic lasers of the first set of pixels are tuned for laser operation in the first temperature range, and wherein the active zones of the optoelectronic lasers of the second set of pixels are tuned to laser operation in the second temperature range.

20. The optoelectronic device according to claim 17, wherein the optoelectronic lasers of the first set of pixels originate from a first wafer and the optoelectronic lasers of the second set of pixels originate from a second wafer.

21. The optoelectronic device according to claim 16, wherein the pixel array comprises a plurality of rows or columns of pixels, wherein in successive rows or columns in each case alternately only pixels of the first set of pixels or pixels of the second set of pixels are arranged, or wherein in each row or column in each case alternately one pixel of the first and of the second set of pixels is arranged.

22. The optoelectronic device according to claim 16, wherein the optoelectronic lasers of the first set of pixels are electrically controllable separately from the optoelectronic lasers of the second set of pixels.

23. The optoelectronic device according to claim 1, wherein at least a first pixel exclusively comprises two or more lasers having a first temperature operating range, and at least a second pixel exclusively comprises two or more lasers having a second temperature operating range.

24. An optoelectronic device for the detection of obstacles and/or for distance measurement, comprising:

a transmitting device for emitting laser beams, wherein the transmitting device comprises an array of pixels, wherein each pixel of the pixel array comprises at least one laser, and a receiving device for detecting laser beams, wherein the pixels of the pixel array are divided into several sets of pixels, wherein each of the several sets of pixels comprises pixels that are spatially distributed across the array of pixels, wherein the transmitting device is configured to operate the sets of pixels at different, successive time intervals, such that during operation of a first set of pixels, the pixels of the other sets of pixels are not operated, wherein the transmitting device is configured to provide a simultaneous illumination of an entire target area via the laser beams from the respective pixels operated in a time interval, wherein the sets of pixels are activated in a random sequence, such that the sets of pixels are operated in a changing order in the different, successive time intervals, and wherein the pixel array comprises a plurality of segments each comprising a localized group of pixels, wherein each set of pixels comprises one pixel from each group of pixels.

25. A lidar system comprising:

at least one optoelectronic device according to claim 1; and an evaluation device for determining a distance to an object reflecting the emitted laser beams in dependence on laser beams detected by means of a receiving device of the optoelectronic device.

26. A method for manufacturing an optoelectronic device according to claim 1, wherein the method comprises:

forming a pixel array comprising a plurality of pixels on a carrier, wherein each pixel comprises at least one optoelectronic laser; and arranging at least one electronic controller for controlling the pixels, wherein for controlling purposes the pixels of the pixel array are divided into several sets of pixels, and wherein the controller is configured in such a way that it drives the sets of pixels at different, successive time intervals.

\* \* \* \* \*